United States Patent
Presti

(10) Patent No.: US 6,783,343 B2
(45) Date of Patent: Aug. 31, 2004

(54) TWO-PIECE RETREAD ENVELOPE

(75) Inventor: Barry W. Presti, Doylestown, PA (US)

(73) Assignee: Tripoint LLC, Doylestown, PA (US)

( * ) Notice: Subject to any disclaimer, the term of this patent is extended or adjusted under 35 U.S.C. 154(b) by 185 days.

(21) Appl. No.: 10/261,763

(22) Filed: Oct. 2, 2002

(65) Prior Publication Data

US 2003/0096031 A1 May 22, 2003

Related U.S. Application Data

(60) Provisional application No. 60/331,485, filed on Nov. 19, 2001.

(51) Int. Cl.$^7$ .............................................. B29D 30/54
(52) U.S. Cl. ...................... 425/14; 156/394.1; 156/909; 425/17
(58) Field of Search .............................. 425/14, 17, 20, 425/25; 156/96, 394.1, 909

(56) References Cited

U.S. PATENT DOCUMENTS

| | | | |
|---|---|---|---|
| 3,207,647 A | * 9/1965 | Schelkmann | 425/14 |
| 3,729,358 A | * 4/1973 | Barefoot | 156/909 |
| 3,837,385 A | * 9/1974 | Schelkmann | 156/909 |
| 3,847,695 A | * 11/1974 | Gross | 156/96 |
| 3,884,740 A | * 5/1975 | Schelkmann | 156/909 |
| 3,895,985 A | * 7/1975 | Schelkmann | 156/96 |
| 3,923,586 A | * 12/1975 | Gross | 156/909 |
| 4,036,271 A | 7/1977 | Presti | 150/54 B |
| 4,634,357 A | 1/1987 | Brewer et al. | 425/36 |
| 4,836,877 A | 6/1989 | Perdue | 156/244.13 |
| 5,098,268 A | * 3/1992 | Robinson | 425/14 |
| 5,346,378 A | 9/1994 | Kassaw, Jr. et al. | 425/28.1 |
| 5,518,384 A | 5/1996 | Presti et al. | 425/36 |

* cited by examiner

Primary Examiner—James P. Mackey
(74) Attorney, Agent, or Firm—Gregory J. Gore

(57) ABSTRACT

A retread autoclave envelope for a vehicle tire casing is a two-part vacuum envelope. A first part has a generally J-shaped cross-section which provides an annular cavity for receiving a first sidewall and the peripheral tread of the tire assembly. A second portion of the envelope forms a closure along a sealed joint against the first envelope portion and lies along the tire casing sidewall. The joint has a contact surface area on the inside surface of a lip of the first part of the envelope and a surface on an outer rim of the closure formed by the second part of the envelope. The closure portion has a generally Z-shaped cross-section. The envelope parts are dimensioned such that the outer diameter of the tire assembly is greater than the inner diameter of the first part of the envelope in the crown area. The first part extends from a near side of the tread across and beyond the far shoulder of the tire assembly to the annular lip in the sealing area of the joint. The second closure envelope part is composed of a semi-rigid material dimensioned such that the outermost diameter of the closure is greater than the inner diameter of the lip of the first envelope part thereby causing an interference fit at the joint.

11 Claims, 9 Drawing Sheets

TWO-PIECE RETREAD ENVELOPE

The present application is related to provisional patent application serial No. 60/331,485 entitled "Two-Piece Retread Envelope" filed on Nov. 19, 2001, priority from which is hereby claimed.

FIELD OF THE INVENTION

The present invention relates generally to tire retreading envelopes and more specifically it relates to a two-piece retread envelope having three points at which it forms a seal around the tire.

BACKGROUND OF THE INVENTION

It is conventional in retreading to use a one-piece annular retread envelope having a U-shaped cross-section that seals at two points. Examples of U-shaped annular retread envelopes are described in detail in U.S. Pat. Nos. 5,346,378; 4,836,877; 4,036,271; 4,634,357; and 5,518,384. These references disclose various concepts of manufacturing and uses of U-shaped radial design retread envelopes.

Worn tread on a used tire casing is buffed off to a profile suitable for mounting a new tread. Then, a pre-cured and buffed tread is adhered about the periphery of the casing with a laminate of uncured cushion gum cemented between the tread and the casing. An outer annular elastomeric curing envelope having an inwardly-opening U-shaped radial cross-section is positioned over the new tread and a portion of the outer sidewall of the tire casing. A pair of annular elastomeric sealing rings are secured about the inner peripheral beads of the tire casing and cooperate with the outer curing envelope to enclose the tire casing outer sidewalls. A vacuum is drawn through a valve in the outer curing envelope for stretching the envelope into intimate contact with all surfaces of the tread. The tire is then placed in an autoclave for several hours at an elevated temperature and pressure to cure the gum and positively bond the casing and tread. The outer curing envelope and sealing rings are removed and the retreaded tire is ready for use. Thus, retreading envelopes have been used for years and typically they are composed of a compound material that is heat resistant and molded in an annular configuration which covers all three surfaces of the tire, namely the peripheral tread and the two opposing sidewalls.

The main problem with conventional retread envelopes is premature failure during this process of enveloping the tire. The U-shaped cross-section retread envelope requires the envelope to be stretched over the tire being retreaded. The process of enveloping the tire using this design can require the compound to elongate as much as (700%) seven hundred percent. This extreme elongation causes the retread envelope to either tear or lose its elastic quality, which is known in the industry as "bagging out." Another problem with conventional retread envelopes is the extreme elongation to envelope the tire which is achieved by formulating the compound to be polymer rich making it expensive to manufacture. Compounds formulated to be polymer rich rather than carbon rich and elongate as much as (700%) seven hundred percent do not heat-age well which makes them expensive to use. Another problem with conventional tire retreading is the level of difficulty for the end user during the process of enveloping the tire due to its U-shaped cross-section.

While these devices may be suitable for the particular purpose to which they address, they are not as suitable for the process of curing precure tread to a tire casing as the present invention which meets the need for a more durable, cost-effective, and safer retread envelope system. The general purpose of the present invention, which will be described subsequently in greater detail, is to provide a new two-piece retread envelope that has many of the advantages mentioned heretofore and many novel features that result in a new two-piece retread envelope which is not anticipated, rendered obvious, suggested, or even implied by any of the prior art, either alone or in any combination thereof.

SUMMARY OF THE INVENTION

In view of the foregoing disadvantages inherent in the known types of retread envelopes now present in the prior art, the present invention provides a new two-piece retread envelope wherein the same can be utilized for curing precure tread to a tire casing to provide a more durable, cost effective, and safer-to-use envelope. This is achieved by a two-piece retread envelope having three points at which it forms a seal around the tire. A first sealing point is located at the sealing bead of the tire. A second sealing point is the bead area on the opposite side of the tire. A third sealing point is located along a seam between the two envelope parts near the outside diameter of the tire.

It is therefore the primary objective of the present invention to provide a two-piece retread envelope which will overcome the shortcomings of the prior art devices.

Another objective of the present invention is to provide a two-piece retread envelope for curing precure tread to a tire casing to provide a more durable, cost effective, and safer-to-use envelope.

Yet another objective is to provide a two-piece retread envelope which is more cost effective for the end user. This is achieved by employing a two-piece design retread envelope, which has a minimal need for elongation. Tearing of envelopes is virtually eliminated. This design allows the compound to be formulated carbon rich rather than polymer rich reducing the material and manufacturing cost. The carbon rich formulation improves longevity and eliminates bagging out.

Another objective is to provide a two-piece retread envelope which is safer and easier for and easier to manufacture. Yet another objective is to provide a two-piece retread envelope which is more versatile and requires less inventory.

To achieve these objectives, a partial envelope providing an annular cavity and having a J-shaped cross-section together with a radial sidewall closure having a Z-shaped cross-section are employed. Both are molded from a heat resistant compound. The two-piece envelope requires minimal need for elongation making it effortless to mount and dismount from the mold during the manufacturing process.

More specifically, the applicant has invented a retread autoclave vacuum envelope for a vehicle tire casing comprising a first portion of a two-part retread vacuum envelope having a generally J-shaped cross-section providing an annular cavity for receiving a first sidewall and the peripheral tread of a tire assembly. The tire assembly comprises a tire casing, an encircling pre-cured tread, and an intermediate layer of adhesive affixing a crown of the casing to the tread. The first portion is a unitary element providing scalable contact against a first sidewall of the tire casing and extending radially outwardly along a first sidewall from a bead area of the tire casing, then laterally across the outer surface of the tread and extending beyond a far shoulder of the tire assembly to an annular seal lip. A second portion of the envelope being a unitary annular closure lies along a second tire casing sidewall, the closure including a sealed joint against the first envelope portion. The joint has contact surface areas on an inside surface of the lip of the first envelope portion adjacent the far shoulder of the tire assembly and a surface area on an outer rim of the closure. The closure has a generally Z-shaped cross-section comprising a reinforced edge along its outer diameter, a generally laterally-extending outer rim, a radially inward extending skirt portion, and an inner rim adjacent an inside diameter of the closure molded to form fit a bead of the tire casing. The sidewall closure further includes a reinforced edge along an innermost surface thereof. The outer diameter of the tire assembly is greater than the inner diameter of the first portion of the envelope in a crown area thereof, the first portion extending from a near side of the tread across and beyond the far shoulder of the tire assembly to the annular lip in a sealing area of the joint. The sidewall closure is composed of the semi-rigid material dimensioned such that the outermost diameter of the sidewall closure is greater than the inner diameter of the lip of the first envelope portion, thereby causing an interference fit therebetween. The envelope further includes a radially expanding sealing ring mounted against the bead area of the tire casing, the ring forceably pressing the inner rim of the closure against the bead area of the tire casing. A valve restricts the flow of air through a port located through the surface of the first envelope portion. The first envelope portion and the closure are both composed of a heat resistant compound. The seal lip projects laterally away from the second tire casing sidewall. An alternate embodiment is further described in that the lip extends partway along an upper portion of the second tire sidewall. In yet another embodiment, a first J-shaped envelope is in sealed contact with a second closure envelope along a peripheral seam which is adjacent the crown area of the tire tread.

There has thus been outlined, rather broadly, the more important features of the invention in order that the detailed description thereof may be better understood, and in order that the present contribution to the art may be better appreciated. There are additional features of the invention that will be described hereinafter. In these respects, the two-piece retread envelope according to the present invention substantially departs from the conventional concepts and designs of the prior art, and in so doing provides an apparatus primarily developed to be more durable, cost effective and safer to use.

To the accomplishment of the above and related objectives, this invention may be embodied in the form illustrated in the accompanying drawings, attention being called to the fact, however, that the drawings are illustrative only, and that changes may be made in the specific construction illustrated. Various other objectives, features and attendant advantages of the present invention will become fully appreciated as the same becomes better understood when considered in conjunction with the accompanying drawings, in which like reference characters designate the same or similar parts throughout the several views

DESCRIPTION OF THE PREFERRED EMBODIMENT

Figure 1:
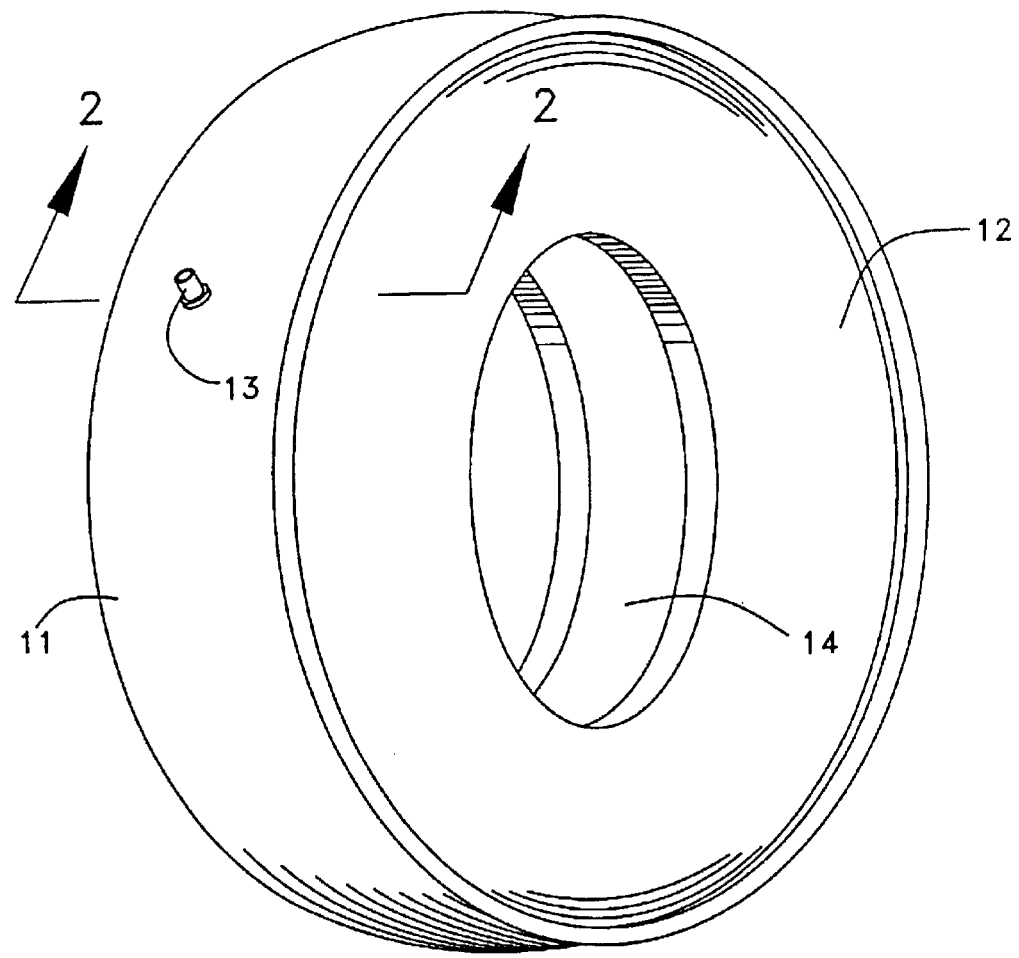
FIG. 1 is a perspective view of the present invention.

Turning now descriptively to the drawings, in which similar reference characters denote similar elements throughout the several views, the attached figures illustrate a two-piece retread envelope which is comprised of a two-piece design. An annular envelope portion covers one sidewall and the outer periphery of the tire to be retread, and a radial sidewall closure covers the other sidewall and joins the envelope portion along a sealable seam. Both pieces are molded using a heat resistant compound. Before explaining the following embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

Figure 2:
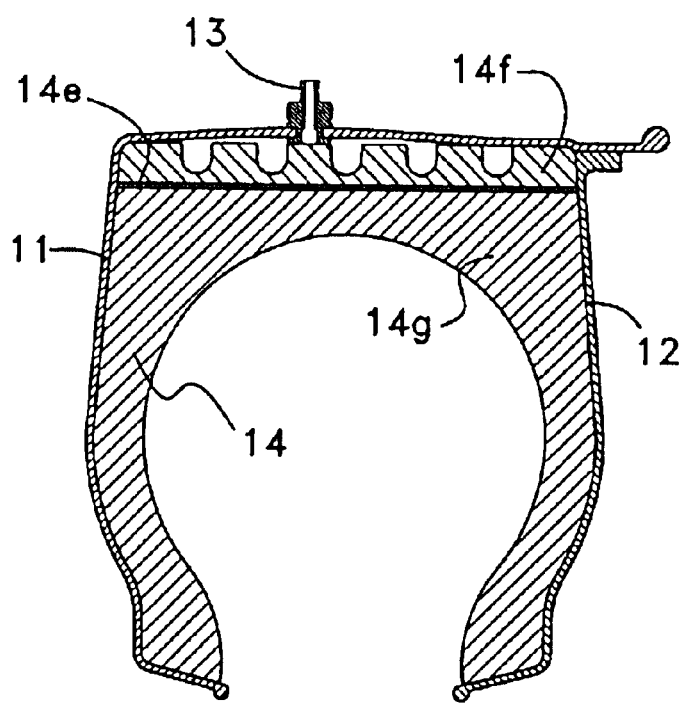
FIG. 2 is a view in radial cross-section taken along line 2—2 of FIG. 1.

An embodiment of the invention is generally depicted in FIG. 1 which shows partial envelope 11 that provides an annular tire-receiving cavity. Mating sidewall closure 12 envelops a tire assembly 14 and is sealed to the envelope portion along a peripheral seam which is thereby prepared for the retreading process. For simplicity, in referring to these two main structures of the invention, they will hereinafter be referred to as the "J-shaped envelope" and "Z-shaped radial sidewall closure." The designation "J-shaped" refers to the general cross-sectional shape of the partial envelope which defines an annular cavity that receives a tire to be retread. The designation "Z-shaped" refers to the general cross-sectional shape of the radial sidewall closure which seals against the partial envelope at a joint and which encompasses the opposing tire sidewall. The J-shape of envelope 11 and Z-shape of sidewall closure 12 are clearly seen as depicted in FIG. 2 and as further described below. A valve 13 in the envelope 11 provides a connection for venting and/or drawing a vacuum during the retread process.

FIG. 2 illustrates a tire assembly 14 which includes a used tire casing 14g with a pre-cured tread 14f adhered to the crown of the casing by a layer of gum stock 14e (hereinafter "tire assembly"), a J-shaped envelope 11, and a Z-shaped sidewall closure 12 installed to contiguously cover the tire assembly.

Figure 3:
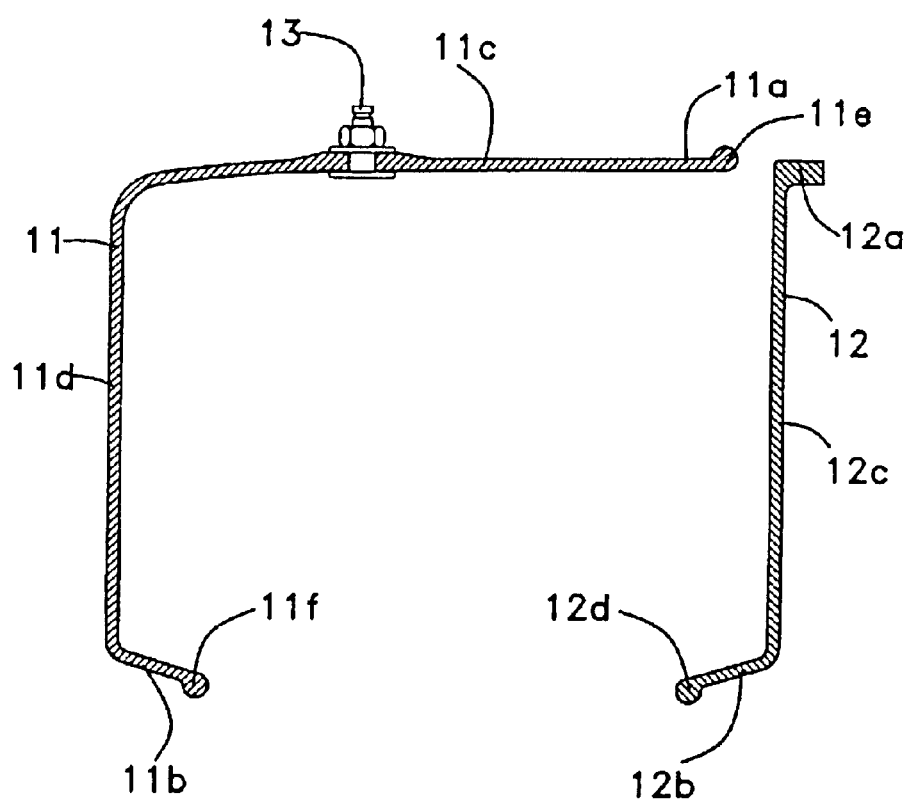
FIG. 3 is a view in radial cross-section of the invention in an uninstalled relaxed state.

FIG. 3 illustrates in greater detail the J-shaped envelope 11 and Z-shaped sidewall closure 12 for sealing in the shoulder area of the tire. In this figure, the elements are separate from the tire assembly and shown in a relaxed state. The J-shaped envelope is made of a heat resistant compound molded in a J-shaped radial cross-section having reinforced edges 11e and 11f, a crown area 11c, a radially outward extending skirt 11d, and a short angled skirt 11b molded to form fit the bead area of the tire. A seal lip 11a is located adjacent the crown area of the envelope. The Z-shaped radial sidewall closure is made of a heat resistant compound molded in a Z-shaped radial cross-section having a reinforced outer rim 12a, a radial inward extending skirt 12c, and an inner rim 12b molded to form fit the bead area of the tire with a reinforced edge 12d.

Figure 4:
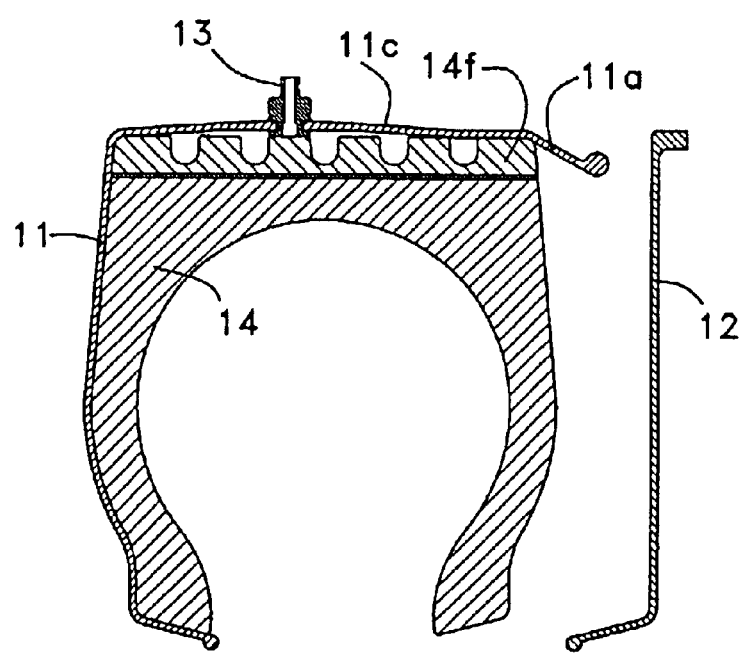
FIG. 4 is a view in radial cross-section of the invention partially enveloping the tire.

FIG. 4 shows the J-shaped envelope 11 of the invention installed on the tire assembly 14. The outer diameter of the tire assembly 14 is greater than the inner diameter of the crown area 11c causing an interference fit in the crown area where the surfaces of these components meet. The crown area 11c extends past the maximum width of the tread area 14f forming seal lip 11a which projects laterally outward from the side of the tire assembly.

Figure 5:
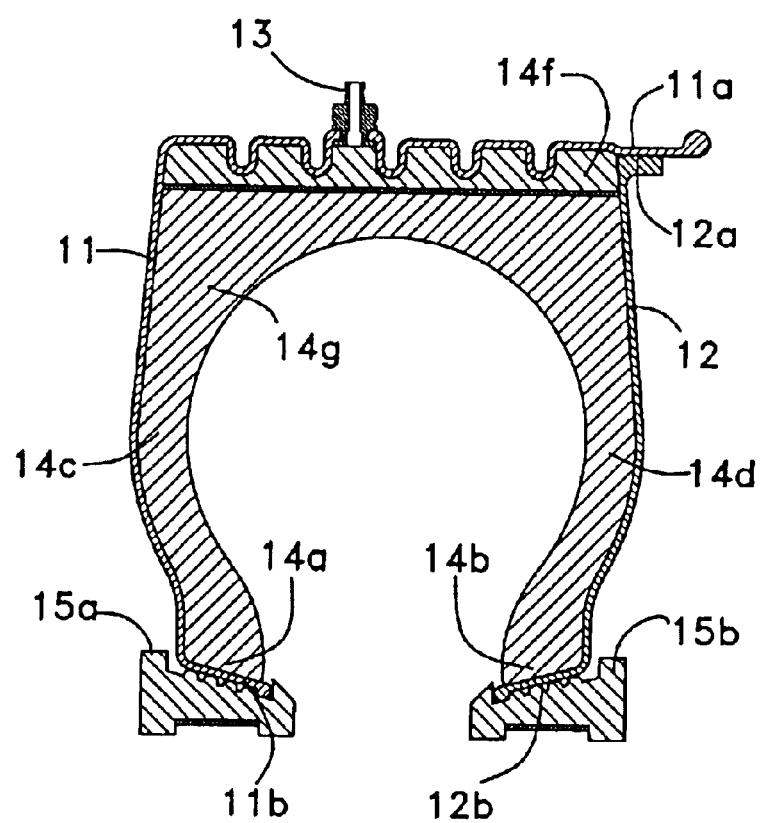
FIG. 5 is a view in radial cross-section of the invention enveloping the tire in a vacuumed state.

FIG. 5 further illustrates the embodiment of FIG. 4 but with a vacuum drawn through valve 13 and sealing rings 15a and 15b applied. The tire assembly 14, J-shaped envelope 11, and Z-shaped sidewall closure 12 are installed for contiguously covering the tire assembly 14. The sidewall closure 12 is composed of a semi-rigid material and dimensioned such that the outermost diameter of the Z-shaped sidewall closure 12 is greater than the inner diameter of J-shaped envelope sealing lip 11a causing an interference fit providing a mechanical seal between the lip and the outer rim 12a of the closure. Radially expanding sealing rings 15a and 15b are mounted on opposing bead areas 14a and 14b of the tire to create a mechanical seal with short angled skirt 11b and inner rim 12b, respectively. Radially expanding sealing rings are provided in accordance with the teachings of U.S. Pat. No. 4,634,357, issued to Brewer, the disclosure of which is hereby incorporated by reference herein. The J-shaped envelope and the Z-shaped sidewall closure are shown in a stressed state being drawn by a vacuum through valve 13 against the surface contours of the tread 14f and sidewalls 14c and 14d of the tire casing 14g ready for placing in a curing chamber under controlled temperature and pressure.

Figure 6:
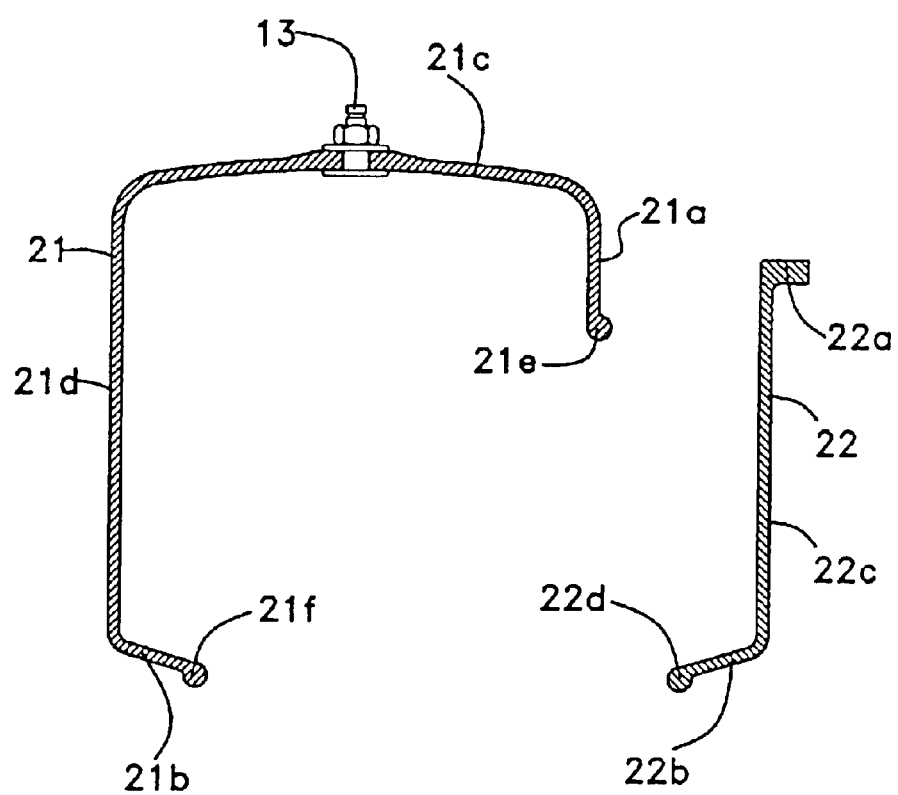
FIG. 6 is a view in radial cross-section of the invention with alternative sidewall seal configuration.
Figure 7:
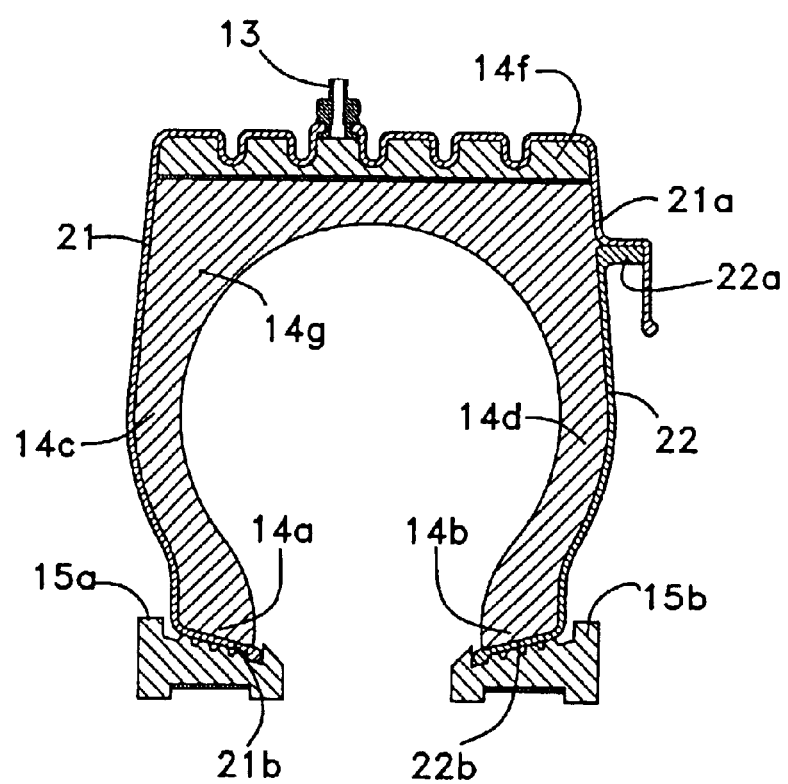
FIG. 7 is a view in radial cross-section of the invention with alternative sidewall seal configuration enveloping a tire in a vacuumed state.

FIGS. 6 and 7 depict an embodiment utilizing an alternative J-shaped envelope 21 and a narrower annular Z-shaped sidewall closure 22 for sealing in the sidewall area of the tire. FIG. 6 depicts this embodiment in a relaxed state separate from the tire assembly. As in the previous embodiment, the J-shaped envelope is made of a heat resistant compound, molded in a J-shaped radial cross-section having reinforced edges 21e and 21f. However, in this embodiment, the envelope includes a lip 21a which extends partway along the tire sidewall on an upper portion thereof. The envelope also includes a crown area 21c, a radial inward extending skirt 21d, and short angled skirt 21b molded to form fit the bead area of the tire. The short skirt Z-shaped sidewall closure is made of a heat resistant compound, molded in a Z-shaped radial cross-section having a sealing area/reinforced edge 22a, a radial inward extending skirt 22c, and short angled inner rim 22b molded to form fit the bead area of the tire with a reinforced edge 22d.

Referring now to FIG. 7, the alternate embodiment depicted in FIG. 6 is shown applied to a tire assembly. The outer diameter of the Z-shaped sidewall closure 22 is greater than the inner diameter of the J-shaped envelope sealing lip 21a causing an overlapping fit creating a mechanical seal when a vacuum is drawn. Radial expanding sealing rings 15a and 15b are mounted on opposing bead areas 14a and 14b of the tire to create a mechanical seal between skirt 21b and inner rim 22b and the tire bead areas. The J-shaped envelope 21 and the Z-shaped sidewall closure 22 are shown in a stressed state being drawn by a vacuum through valve 13 against the surface contours of the tread 14f and sidewalls 14c and 14d of the tire casing 14g ready for placing in a curing chamber under controlled temperature and pressure.

Figure 8:
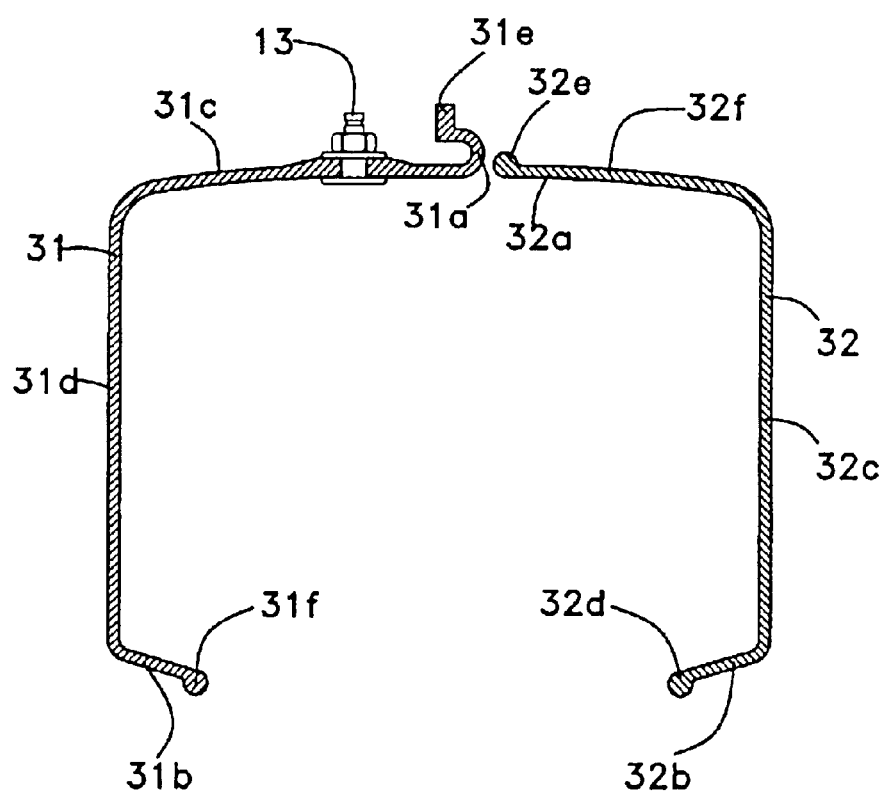
FIG. 8 is a view in radial cross-section of the invention with alternative crown area seal configuration.
Figure 9:
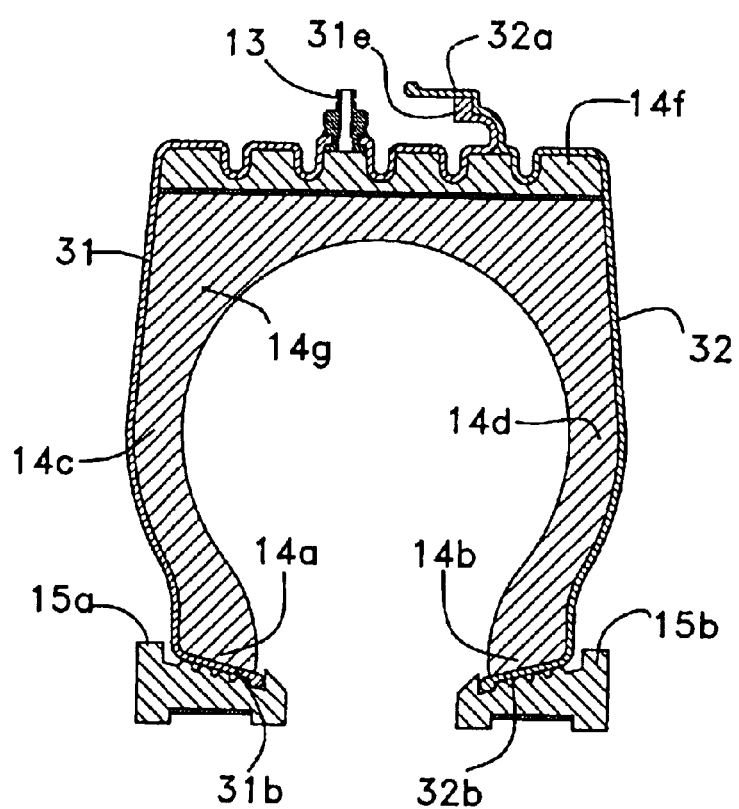
FIG. 9 is a view in radial cross-section of the invention with alternative crown area seal configuration enveloping a tire in a vacuumed state.

FIGS. 8 and 9 illustrate yet another alternate embodiment which includes a first J-shaped envelope 31 and a second J-shaped envelope 32 which meet at a seal joint in the crown area of the tire. FIG. 8 depicts this embodiment separate from the tire assembly and in a relaxed state. The first J-shaped envelope is made of a heat resistant compound, molded in a J-shaped radial cross-section having a sealing lip along reinforced edge 31e, recurve bend 31a, a short crown area 31c which can only cover part of the tire tread width, a radial inward extending skirt 31d, and a short angled skirt 31b molded to form fit the bead area of the tire and a reinforced edge 31f. The second J-shaped envelope is made of a heat resistant compound molded in a J-shaped radial cross-section having a reinforced edge 32e, a sealing area 32a, a short crown area 32f, a radially inward extending skirt 32c, and an inner rim 32b molded to form fit the bead area of the tire with a reinforced edge 32d.

FIG. 9 illustrates the embodiment of FIG. 8 as applied to a tire assembly after a vacuum has been drawn. The outermost diameter of the first J-shaped envelope sealing lip adjacent a reinforced edge 31e is greater than the inner diameter of the second J-shaped envelope sealing area 32a causing an interference fit and creating a mechanical seal when a vacuum is drawn. Radial expanding sealing rings 15a and 15b are mounted on opposing tire bead areas 14a and 14b to create a mechanical seal between the skirt 31b and inner rim 32b and the tire bead areas 14a and 14b, respectively. The first J-shaped envelope and the second J-shaped envelope are shown in this figure in a stressed state being drawn by a vacuum through valve 13 against the surface contours of the tread 14f and sidewalls 14c and 14d of the tire casing 14g ready for placing in a curing chamber under controlled temperature and pressure. The seal between the envelopes in this embodiment occurs along an overlapping peripheral seam between the sealing area of the second envelope and the recurve bend of the first envelope at the lip adjacent a reinforced edge 31e along the crown area of the tire tread.

As to a further discussion of the manner of usage and operation of the present invention, the same should be apparent to one of ordinary skill in the art from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which shall be defined only by the following claims and their legal equivalents.

What is claimed is:

1. A retread vacuum envelope for a vehicle tire casing, comprising:

a first portion of a two-part retread vacuum envelope having a generally J-shaped cross-section providing an annular cavity for receiving a first sidewall and the peripheral tread of a tire assembly, said tire assembly comprising a tire casing, an encircling pre-cured tread, and an intermediate layer of adhesive affixing a crown of said casing to said tread, said first portion being a unitary element extending radially outwardly along a first sidewall from a bead area of the tire casing and then laterally across the outer surface of said tread and extending beyond a far shoulder of said tire assembly to an annular seal lip; and a second portion forming said envelope being a unitary annular closure lying along a second tire casing sidewall, said closure including a sealed joint against said first envelope portion, said joint having contact surface areas on an inside surface of said lip of the first envelope portion adjacent the far shoulder of the tire assembly and a surface area on an outer rim of said closure.

2. The retread envelope of claim 1 wherein said closure has a generally Z-shaped cross-section comprising a reinforced edge along its outer diameter, a generally laterally-extending outer rim, a radially inward extending skirt portion, and an inner rim adjacent an inside diameter of said closure molded to form fit a bead of the tire casing.

3. The retread envelope of claim 2 wherein said sidewall closure further includes a reinforced edge along an innermost surface thereof.

4. The retread envelope of claim 3 wherein the outer diameter of the tire assembly is greater than the inner diameter of the first portion of said envelope in a crown area thereof, said first portion extending from a near side of the tread across and beyond the far shoulder of the tire assembly to said annular lip in a sealing area of said joint.

5. The retread envelope of claim 4 wherein the sidewall closure is composed of the semi-rigid material dimensioned such that the outermost diameter of the sidewall closure is greater than the inner diameter of the lip of the first envelope portion, thereby causing an interference fit therebetween.

6. The retread envelope of claim 5 further including a radially-expanding sealing ring mounted against the bead area of said tire casing, said ring forceably pressing said inner rim of said closure against said bead area of the tire casing.

7. The retread envelope of claim 6 further including a valve restricting the flow of air through a port located through the surface of said first envelope portion.

8. The retread envelope of claim 7 wherein said first envelope portion and said closure are both composed of a heat resistant compound.

9. The retread envelope of claim 1 wherein said seal lip projects laterally away from the second tire casing sidewall.

10. A retread vacuum envelope for a vehicle tire casing, comprising:

a first portion of a two-part retread vacuum envelope having a generally J-shaped cross-section providing an annular cavity for receiving a first sidewall and the peripheral tread of a tire assembly, said tire assembly comprising a tire casing, an encircling pre-cured tread, and an intermediate layer of adhesive affixing a crown of said casing to said tread, said first portion providing form-fit contact against a tire bead and further extending radially outwardly along a first sidewall and then laterally across a portion of the outer surface of said tread to a seal lip having a recurve bend thereon; and a second closure portion of said envelope having a J-shaped cross-section and lying along a second tire casing sidewall extending radially outwardly thereal-ong and then laterally across the outer surface of said tread across the recurve lip of said first envelope portion, the outer surface of said second closure envelope portion lying along said tread and forming a sealed joint with said first envelope portion lip.

11. The retread envelope of claim 1 wherein the sealing lip extends partway along an upper portion of said second tire sidewall.

* * * * *